(12) United States Patent
Kleve et al.

(10) Patent No.: US 9,238,450 B1
(45) Date of Patent: Jan. 19, 2016

(54) VEHICLE MASTER RESET

(71) Applicant: Ford Global Technologies, LLC, Dearborn, MI (US)

(72) Inventors: Robert Bruce Kleve, Ann Arbor, MI (US); Thomas Lee Miller, Ann Arbor, MI (US); Maria Eugenia Protopapas, Canton, MI (US); Scott Alan Watkins, Canton, MI (US); Eric L. Reed, Livonia, MI (US); Jon Holt, Howell, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/481,397

(22) Filed: Sep. 9, 2014

(51) Int. Cl.
*B60R 25/24* (2013.01)

(52) U.S. Cl.
CPC ..................... *B60R 25/241* (2013.01)

(58) Field of Classification Search
USPC ............................................................ 701/2
See application file for complete search history.

(56) References Cited

U.S. PATENT DOCUMENTS

| | | | |
|---|---|---|---|
| 6,430,488 B1 | 8/2002 | Goldman et al. | |
| 6,611,755 B1* | 8/2003 | Coffee | B28C 5/422 340/438 |
| 6,816,089 B2* | 11/2004 | Flick | B60R 25/04 340/539.13 |
| 7,075,409 B2 | 7/2006 | Guba | |
| 7,778,746 B2* | 8/2010 | McLeod | G07C 5/008 320/109 |
| 7,818,097 B2 | 10/2010 | Fein et al. | |
| 8,258,939 B2 | 9/2012 | Miller et al. | |
| 8,340,989 B2 | 12/2012 | Weinstock et al. | |
| 8,370,268 B2 | 2/2013 | Ehrman et al. | |
| 8,786,424 B2* | 7/2014 | Vilela | B60W 50/0205 340/501 |
| 8,964,779 B2* | 2/2015 | Barrenscheen | G05B 19/0421 370/465 |
| 2004/0010358 A1 | 1/2004 | Oesterling et al. | |
| 2007/0239321 A1* | 10/2007 | McAden | G07C 5/008 701/1 |
| 2009/0167524 A1 | 7/2009 | Chesnutt et al. | |
| 2010/0036560 A1 | 2/2010 | Wright et al. | |

* cited by examiner

*Primary Examiner* — Thomas Tarcza
*Assistant Examiner* — Alex C Dunn
(74) *Attorney, Agent, or Firm* — Frank A. MacKenzie; Brooks Kushman P.C.

(57) ABSTRACT

Exemplary methods and vehicles are disclosed. Exemplary methods may include determining that a vehicle is a fleet vehicle, establishing a presence of a configuration bit indicating the vehicle is a fleet vehicle, receiving an indication of a conclusion of a vehicle usage session as a fleet vehicle, and resetting a plurality of user-adjustable vehicle parameters to a default setting in response to the conclusion of the vehicle usage. Other exemplary methods may include installing a configuration bit into a vehicle, which indicates that the vehicle is a fleet vehicle, and providing a processor for the vehicle. The processor may be configured to reset a plurality of user-adjustable vehicle parameters to a default setting in response to the configuration bit and an indication of a conclusion of a vehicle usage associated with the vehicle.

20 Claims, 4 Drawing Sheets

VEHICLE MASTER RESET

BACKGROUND

Many vehicles are equipped with systems that allow customers to customize various aspects their vehicles. For example, these systems include systems that allows the user to configure a key to restrict vehicle functionality, e.g., to a maximum vehicle speed, audio volume, etc. Other systems include interactive display screen(s) that allows the user to load a customized picture to be used as the background. Other examples include vehicles equipped with an infotainment system that allows the user to pair personal electronic devices to the vehicle. Data may be copied from the personal electronic devices to the vehicle such as a personal contact list, call history, and digital music. In other examples, a navigation system allows the user to store specific destinations or points of interest, and record a history of the vehicles location on a map. Still other examples include vehicle systems that allow the user to store and recall vehicle settings such as seat and mirror position, or default languages used by vehicle systems.

Although these systems enhance the retail customer's driving experience, they present a unique problem for fleet operators such as rental car companies. The configurable systems for certain vehicles provides convenience to rental customers, for example, but in some cases a rental customer may load undesirable content on the vehicle. Accordingly, future customers might find the vehicle settings inconvenient or in some cases, offensive. For example, if the memory seat position were programmed closest to the steering wheel, future rental customers may be inconvenienced when getting into the vehicle. Additionally, the previous customer might have programmed one of the keys to restrict the vehicle's maximum speed or audio volume, or loaded offensive material such as provocative music or pictures.

Although these systems typically may allow customers to adjust or reset certain settings, it is not necessarily convenient for a rental company to reset vehicle settings due to the nature of the rental car business. Moreover, it is not ideal to implement a commonly available means to defeat customizable vehicle systems that could be unintentionally used to defeat the system.

Accordingly, there is a need for a vehicle and/or a method that would facilitate fleet operators such as rental companies to quickly and easily restore the vehicle to original factory settings, e.g., when a rental customer returns the vehicle.

SUMMARY

Various exemplary illustrations described herein are directed to a method, which may include determining that a vehicle is a fleet vehicle, and establishing a presence of a configuration bit indicating the vehicle is a fleet vehicle. Exemplary methods may further include receiving an indication of a conclusion of a vehicle usage session as a fleet vehicle, and resetting a plurality of user-adjustable vehicle parameters to a default setting in response to the conclusion of the vehicle usage.

Another exemplary method may include installing a configuration bit into a vehicle, which indicates that the vehicle is a fleet vehicle, and providing a processor for the vehicle. The processor may be configured to reset a plurality of user-adjustable vehicle parameters to a default setting in response to the configuration bit and an indication of a conclusion of a vehicle usage associated with the vehicle.

Exemplary illustrations are also directed to vehicle comprising a processor in communication with a plurality of user-adjustable vehicle settings, and a configuration bit stored on the vehicle indicating that the vehicle is a fleet vehicle. The processor may be configured to reset a plurality of user-adjustable vehicle parameters to a default setting in response to at least the configuration bit and an indication of a conclusion of a vehicle usage associated with the vehicle.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Figure 1:
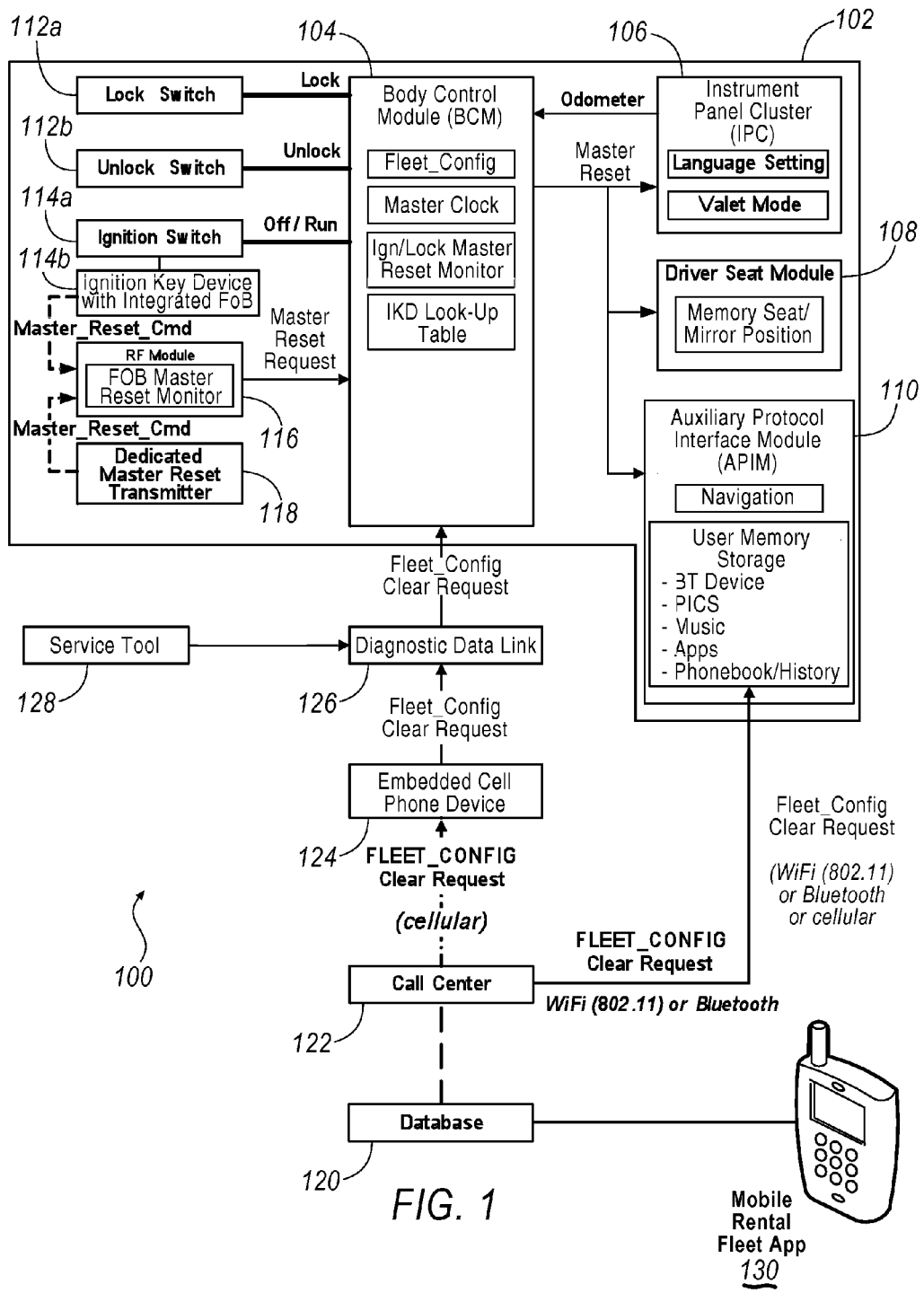
FIG. 1 is a schematic view of an exemplary system for resetting a plurality of vehicle settings.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Turning now to FIG. 1, an exemplary system 100 including a vehicle 102 configured to facilitate activation of a reset operation for the vehicle is schematically illustrated. System 100 may generally facilitate a method for rental car companies to quickly and easily restore factory settings on a vehicle when transferring a vehicle from one customer to another. The system 100 and associated methods, several exemplary illustrations of which are described further below, generally may include a configuration bit that temporarily designates the vehicle as a vehicle intended for fleet use in some context, e.g., as a rental vehicle. In some exemplary illustrations, the configuration bit may include data or information stored on a processor associated with the vehicle, e.g., a vehicle electronic control unit (ECU) or the like. In other exemplary approaches, a configuration bit may be installed to a vehicle via a key or other removable hardware. When the configuration is active on the vehicle, a unique sequence of inputs is used to restore factory settings on the major systems of the vehicle. The sequence of inputs is designed to be implemented easily, and quickly. Additionally, they may also be configured to be intentionally actuated, i.e., they are designed to be unlikely to be triggered accidentally in normal operation of the vehicle 102. In other exemplary illustrations, the vehicle may be reset using a remote signal generated from a fleet operator, e.g., a rental car company, or by way of a wireless device and/or application.

Referring now to FIG. 1, an exemplary vehicle 102 is illustrated. The vehicle 102 may be in communication with, for example, a call center 122, a database 120, and a mobile rental fleet application 130. The vehicle may be in communication with the call center 122 via one or more mobile communication devices 124, and/or a diagnostic data link 126. Data link 126 may in turn be in communication with a service tool 128. The call center 122, database 120, and/or mobile rental fleet application 130 may be linked with other system components via communications links including, merely as examples, networks such as internet protocol (IP) packet core networks configured to transmit and switch packets sent across the networks. Alternatively or in addition, other types of networks may be employed.

Vehicle 102 may generally include a body control module 104, an instrument panel cluster 106, a driver seat module 108, and auxiliary protocol interface module 110. Other elements of vehicle 102 may include a lock switch 112a and unlock switch 112b (which may be provided as a single lock/unlock switch 112), an ignition switch 114a and associated key or card device 114b, a radio frequency (RF) module 116, and a master reset transmitter 118.

Figure 2:
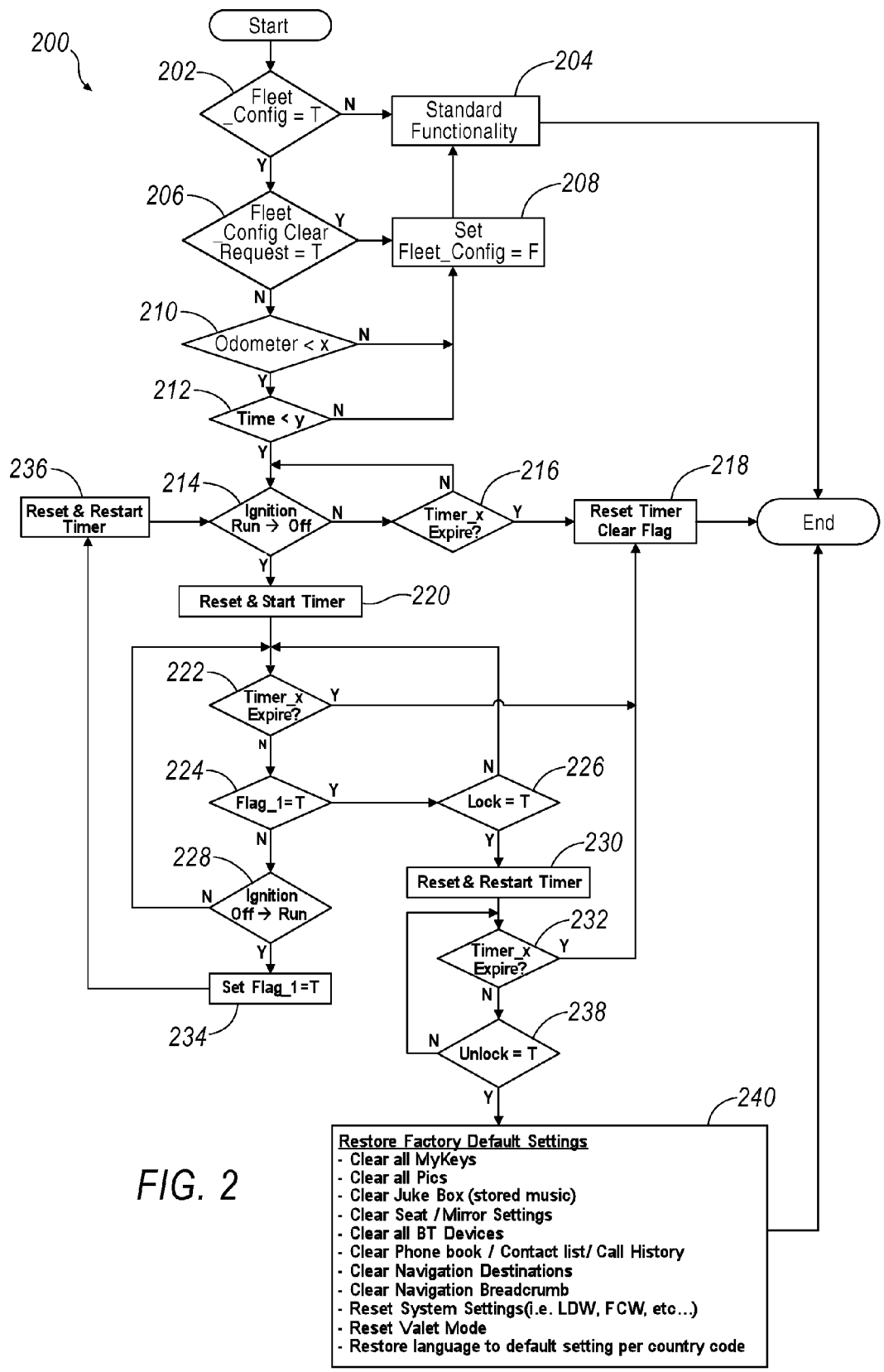
FIG. 2 is a process flow diagram for an exemplary method of resetting a plurality of vehicle settings.
Figure 4:
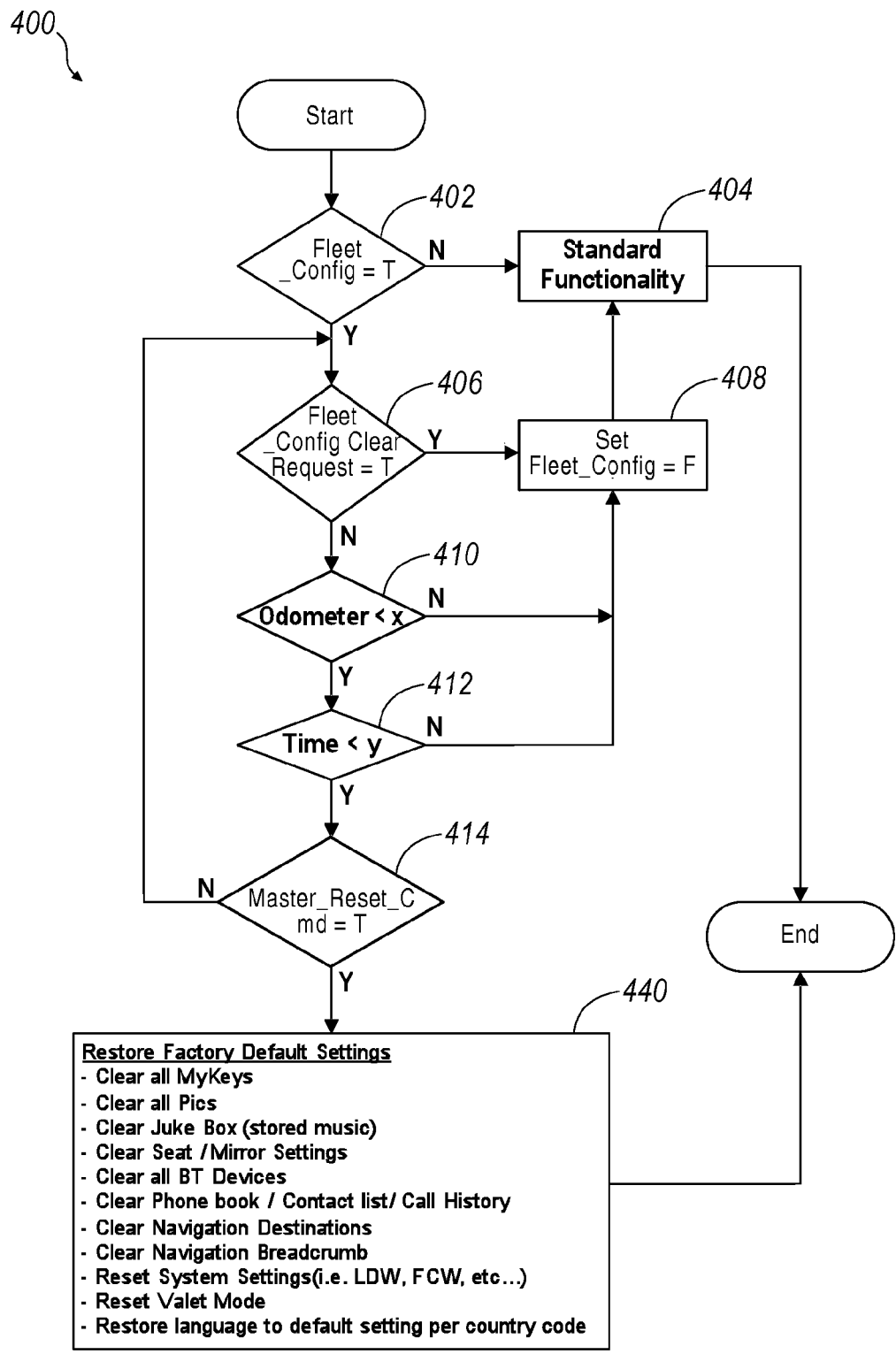
FIG. 4 is a process flow diagram for a method of resetting a plurality of vehicle settings, according to another exemplary illustration.

Turning now to FIGS. 2 and 4, exemplary methods and processes that may be employed in conjunction with vehicle 102 are described in further detail. For example, as shown in FIG. 2, the rental company could use vehicle hardware, e.g., the ignition switch 114 and door lock switch 112, to trigger a master reset. Using the key 114b, the rental company employee may enter a predetermined pattern using the switches 112, 114 within a predetermined time period. For example, a rental company employee may simply cycle the ignition switch 114a from RUN to OFF to RUN to OFF, and then LOCK and UNLOCK the vehicle using the lock/unlock switch 112. Each step within the sequence would have to be completed within a specified amount of time (e.g., 2 seconds) in order to trigger a reset. Moreover, a pattern such as the exemplary approach described herein is extremely unlikely to ever be unintentionally or accidentally entered, given the need to actuate the ignition switch and door lock switch in the cooperating fashion described.

In this exemplary approach, the sequence will only trigger a master reset if the FLEET_CONFIG bit is "TRUE." The FLEET_CONFIG bit may be set to "TRUE" at the assembly plant, and may remain TRUE until any one of the following conditions is met:

The vehicles odometer achieves a predetermined number of miles (e.g., 50,000 miles or any other predetermined limit associated with a fleet lifetime);

A FLEET_CONFIG bit has been TRUE for a specified amount of time (e.g., 12 months or any other predetermined time limit generally associated with expected length of service for vehicle 102 in a fleet such as a rental fleet);

A service tool sets the FLEET_CONFIG bit to FALSE (note: in one exemplary approach, a service tool cannot set the FLEET_CONFIG bit to TRUE in order to protect the integrity of the system and prevent inadvertent or malicious installation of the FLEET_CONFIG bit);

A Call Center that maintains a data base of rental vehicles and remotely sends a signal to the vehicle. For example, a wireless interface can be either cellular, WiFi, or Bluetooth, merely as examples. The cellular signal could be generated from a mobile app on a smart phone.

The above conditions may generally be associated with the conclusion of a vehicle's use in a fleet. Other factors or conditions may be employed, alternatively or in addition to those described above. Accordingly, one or more of the above factors or any other factors may be used to determine a conclusion of a vehicle usage session as a fleet vehicle. As will be described further below, a plurality of user-adjustable vehicle parameters may generally be reset to a default setting in response to at least the conclusion of the vehicle usage. Moreover, in some exemplary approaches, additional signals or inputs may be used in combination with the above conditions, such that the mere expiration of the conditions does not automatically reset the vehicle, but rather places the vehicle 102 in a condition where a master reset command can be initiated.

Referring now to FIG. 2, an exemplary process 200 of initiating a master reset using a vehicle control pattern is described in further detail. Process 200 may generally begin at block 202, where process 200 queries whether a fleet configuration bit is present with respect to vehicle 102, e.g., the FLEET_CONFIG bit mentioned above. If the configuration bit is not present, process 200 proceeds to block 204. At block 204, process 200 determines that vehicle 102 will have a standard functionality. More specifically, a standard functionality may generally permit selective or remote resetting of the various vehicle parameters.

Where process 200 determines that a fleet configuration bit is present at block 202, process 200 proceeds to block 206. At block 206, process 200 queries whether a fleet configuration clear request is present. For example, the fleet configuration clear request may be present when a user or administrator has decided to deactivate a fleet status of the vehicle 102. In such case, process 200 may proceed to block 208. At block 208, process 200 sets a fleet configuration status of vehicle 102 to false. In other words, block 208 generally resets the status of vehicle 102, it is no longer considered a "fleet" vehicle, and selective/remote resetting of the vehicle parameters is no longer permitted.

Where process 200 determines at block 206 that a fleet configuration clear request is not present, process 200 proceeds to block 210. At block 210, process 200 queries whether an odometer reading associated with vehicle 102 exceeds a predetermined amount x. For example, vehicle 102 may initially be set with a predetermined amount x, wherein it is expected that a fleet vehicle will no longer be used in fleet service beyond such an odometer reading. If the vehicle odometer reading exceeds the predetermined value x, process 200 proceeds back to block 208. Alternatively, if the odometer reading of vehicle 102 is still below a predetermined fleet service threshold x, process 200 proceeds to block 212. At block 212, process 200 queries whether an elapsed time associated with vehicle 102, e.g., an expected fleet service interval, has expired. If the predetermined elapsed time, y has been exceeded, process 200 proceeds back to block 208. Alternatively, if the elapsed time associated with vehicle 102 is still below a predetermined expected fleet service threshold y, process 200 may proceed to block 214.

Beginning at block 214, one or more vehicle switches or buttons may be used to initiate a vehicle control pattern configured to initiate a master reset of the vehicle 102. In the example below, an exemplary vehicle control pattern is entered using only a door lock/unlock switch 112 and ignition switch 114, however any other vehicle buttons or controls may be employed that are convenient. In one exemplary approach, at block 214 process 200 queries whether the ignition switch of vehicle 102 is in a run or off position. If the ignition switch is in the off position, process 200 proceeds to block 220, where a timer is reset to zero and started. Proceeding to block 222, process 200 queries whether a predetermined time period measured by the timer begun at block 220 has expired. Block 222 therefore generally routes process 200 back to block 218, where the reset timer is cleared and then terminates if the timer associated with the ignition switch detection has expired.

Alternatively, if the timer has not expired, process 200 proceeds to block 224, where process 200 queries whether a first flag is present. If the first flag has been established, e.g., as described below at block 234, process 200 proceeds to block 226, where process 200 queries whether the vehicle has been locked. If the flag at block 224 is not present process 200 proceeds to block 228, where process 200 queries whether the ignition switch has been moved from off to run. If the ignition switch has been set from off to run in block 228, process 200 proceeds to block 234, where the first flag is set.

Process 200 may then proceed from block 234 to block 236, where the timer initially set at block 220 is reset. At block 226, if the vehicle has been locked, process 200 proceeds to block 230, where the timer is restarted and reset. Process 200 may then proceed to query block 232, which queries whether a predetermined time associated with the process 200 has expired. If the predetermined time period has expired, process 200 proceeds back to block 218 and process 200 then terminates. Alternatively, if the timer does not expired at block 232, process 200 proceeds to block 238. At block 238, process 200 entries a final query to determine whether the vehicle has been unlocked. If the vehicle 102 has been unlocked within the time period determined by the timer from block 232, process 200 proceeds to block 240. Generally, blocks 214-238 of process 200 ensure that a predetermined pattern is entered using the ignition switch and lock/unlock switch within a predetermined period of time. The use of a pattern requiring at least alternating activation of different vehicle switches within a relatively short period of time, e.g., a few seconds, may generally help substantially eliminate the probability of an inadvertent activation of a vehicle master reset command.

At block 240, a plurality of default settings are established for vehicle 102. Merely as examples, settings such as user-specific keys or other hardware, pictures stored in the vehicle, music, seat position and mirror settings, Bluetooth devices, phone books, contact lists, call histories, navigation destinations or waypoints, a custom list of system settings may be reset, a valet mode setting, and a user selected language may all be included amongst the various settings that can be reset. Process 200 may then terminate.

Figure 3:
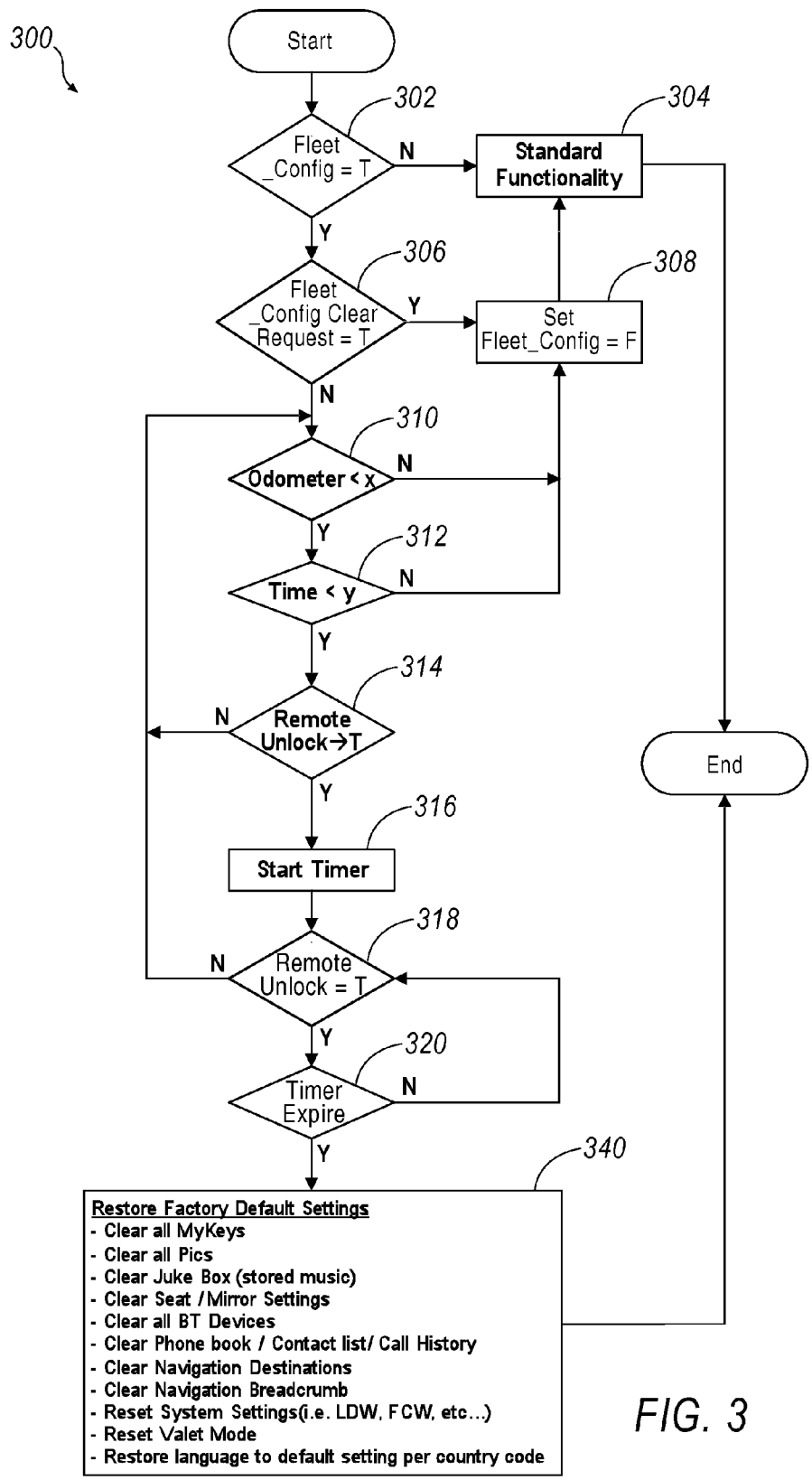
FIG. 3 is a process flow diagram for another exemplary method of resetting a plurality of vehicle settings.

Turning now to FIG. 3, a sequence of remote inputs provided by a key fob may be used to trigger a vehicle master reset. For example, FOB inputs could trigger master reset when the FLEET_CONFIG bit is TRUE. For example, the user could trigger a master reset by pressing and holding the UNLOCK button on FOB for a specified amount of time (e.g., 8 seconds).

Referring now to FIG. 3, an exemplary process 304 of initiating a master reset using a key fob or other RF transmitter associated with vehicle 102 is described in further detail. Process 300 may generally begin at block 302, where process 300 queries whether a fleet configuration bit is present with respect to vehicle 102, e.g., the FLEET_CONFIG bit mentioned above. If the configuration bit is not present, process 300 proceeds to block 304. At block 304, process 300 determines that vehicle 102 will have a standard functionality. More specifically, a standard functionality may generally permit selective or remote resetting of the various vehicle parameters.

Where process 300 determines that a fleet configuration bit is present at block 302, process 300 proceeds to block 306. At block 306, process 300 queries whether a fleet configuration clear request is present. For example, the fleet configuration clear request may be present when a user or administrator has decided to deactivate a fleet status of the vehicle 102. In such case, process 300 may proceed to block 308. At block 308, process 300 sets a fleet configuration status of vehicle 102 to false. In other words, block 308 generally resets the status of vehicle 102, it is no longer considered a "fleet" vehicle, and selective/remote resetting of the vehicle parameters is no longer permitted.

Where process 300 determines at block 306 that a fleet configuration clear request is not present, process 300 proceeds to block 310. At block 310, process 300 queries whether an odometer reading associated with vehicle 102 exceeds a predetermined amount x. For example, vehicle 102 may initially be set with a predetermined amount x, wherein it is expected that a fleet vehicle will no longer be used in fleet service beyond such an odometer reading. If the vehicle odometer reading exceeds the predetermined value x, process 300 proceeds back to block 308. Alternatively, if the odometer reading of vehicle 102 is still below a predetermined fleet service threshold x, process 300 proceeds to block 312. At block 312, process 300 queries whether an elapsed time associated with vehicle 102, e.g., an expected fleet service interval, has expired. If the predetermined elapsed time, y has been exceeded, process 300 proceeds back to block 308. Alternatively, if the elapsed time associated with vehicle 102 is still below a predetermined expected fleet service threshold y, process 300 may proceed to block 314.

Proceeding to block 314, process 300 may then query whether a remote unlock associated with a vehicle key filed associated with vehicle 102 has been activated. If the signal is present, process 300 may proceed to block 316, where the timer is started. Alternatively, if the remote unlock signal has not been received, process 300 proceeds back to block 310.

Proceeding to block 318, process 300 queries whether the remote unlock signal has been activated for a predetermined time T. If remote unlock signal has been present for the predetermined time T, process 300 proceeds to block 320. Alternatively, process 300 proceeds from block 318 back to block 310.

At block 320, process 200 queries whether the timer activated at block 316 has expired. If the timer has expired, i.e. the key fob command such as a remote unlock button has been held down for the predetermined time T, process 300 proceeds to block 340. Alternatively, process 300 may proceed back to block 318.

At block 340, a plurality of default settings are established for vehicle 102. Merely as examples, settings such as user-specific keys or other hardware, pictures stored in the vehicle, music, seat position and mirror settings, Bluetooth devices, phone books, contact lists, call histories, navigation destinations or waypoints, a custom list of system settings may be reset, a valet mode setting, and a user selected language may all be included amongst the various settings that can be reset. Process 300 may then terminate.

Turning now to FIG. 4, a separate standalone transmitter could, alternatively or in addition to other hardware/methods for providing a vehicle master reset, be provided to rental companies that could be used to reset multiple vehicles generally with a single button press. The transmitter could be in the form of an application loaded on a phone that provides a cloud based service for the user to manage their fleet of vehicles.

An exemplary process 400, as illustrated in FIG. 4, may also initiate a master reset using a master remote command associated with a plurality of vehicles 102. Process 400 may generally begin at block 402, where process 400 queries whether a fleet configuration bit is present with respect to vehicle 102, e.g., the FLEET_CONFIG bit mentioned above. If the configuration bit is not present, process 400 proceeds to block 404. At block 404, process 400 determines that vehicle 102 will have a standard functionality. More specifically, a standard functionality may generally permit selective or remote resetting of the various vehicle parameters.

Where process 400 determines that a fleet configuration bit is present at block 402, process 400 proceeds to block 406. At block 406, process 400 queries whether a fleet configuration clear request is present. For example, the fleet configuration clear request may be present when a user or administrator has decided to deactivate a fleet status of the vehicle 102. In such case, process 400 may proceed to block 408. At block 408, process 400 sets a fleet configuration status of vehicle 102 to false. In other words, block 408 generally resets the status of vehicle 102, it is no longer considered a "fleet" vehicle, and selective/remote resetting of the vehicle parameters is no longer permitted.

Where process 400 determines at block 406 that a fleet configuration clear request is not present, process 400 proceeds to block 410. At block 410, process 400 queries whether an odometer reading associated with vehicle 102 exceeds a predetermined amount x. For example, vehicle 102 may initially be set with a predetermined amount x, wherein it is expected that a fleet vehicle will no longer be used in fleet service beyond such a odometer reading. If the vehicle odometer reading exceeds the predetermined value x, process 400 proceeds back to block 408. Alternatively, if the odometer reading of vehicle 102 is still below a predetermined fleet service threshold x, process 400 proceeds to block 412. At block 412, process 400 queries whether an elapsed time associated with vehicle 102, e.g., an expected fleet service interval, has expired. If the predetermined elapsed time, y has been exceeded, process 400 proceeds back to block 408. Alternatively, if the elapsed time associated with vehicle 102 is still below a predetermined expected fleet service threshold y, process 400 may proceed to block 414.

Proceeding to block 414, process 400 queries whether a master reset command has been received (i.e., that the query equals "true" or "T"). For example, a master reset command may be provided by a mobile device, computer, or other application associated with vehicle 102, e.g., as initiated by call center 122, mobile application 130, or any other method of providing a remote command to the vehicle 102. Where the master reset command is present, process 400 may proceed to block 440. Alternatively, process 400 may proceed back to block 406.

At block 440, a plurality of default settings are established for vehicle 102. Merely as examples, settings such as user-specific keys or other hardware, pictures stored in the vehicle, music, seat position and mirror settings, Bluetooth devices, phone books, contact lists, call histories, navigation destinations or waypoints, a custom list of system settings may be reset, a valet mode setting, and a user selected language may all be included amongst the various settings that can be reset. Process 400 may then terminate.

In some exemplary approaches, the exemplary methods described herein may employ a computer or a computer readable storage medium implementing the various methods and processes described herein, e.g., processes 200, 300, and/or 400. In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed, is:

1. A method, comprising:
   determining that a vehicle is a fleet vehicle, including establishing a presence of a configuration bit indicating the vehicle is a fleet vehicle;
   receiving an indication of a conclusion of a vehicle usage session as a fleet vehicle; and
   resetting a plurality of user-adjustable vehicle parameters to a default setting in response to the conclusion of the vehicle usage session.

2. The method of claim 1, wherein resetting the plurality of user-adjustable vehicle parameters includes remotely resetting the plurality of user-adjustable vehicle parameters.

3. The method of claim 2, further comprising establishing the remotely resetting as remotely resetting with one of a key fob and a wireless device.

4. The method of claim 2, further comprising establishing the remotely resetting as remotely resetting with a wireless device in communication with a remote database including a plurality of fleet vehicles.

5. The method of claim 1, wherein resetting the plurality of user-adjustable vehicle parameters includes entering a vehicle control pattern using a plurality of vehicle control inputs.

6. The method of claim 5, wherein the plurality of vehicle control inputs include at least one of a vehicle door lock switch and an ignition switch.

7. The method of claim 1, further comprising establishing the configuration bit as being stored on a memory of the vehicle.

8. The method of claim 1, further comprising establishing the configuration bit as being configured to expire after a predetermined event.

9. The method of claim 8, wherein the predetermined event is one of a vehicle mileage limit and a time limit.

10. A method, comprising:
    installing a configuration bit into a vehicle, the configuration bit indicating that the vehicle is a fleet vehicle; and
    providing a processor for the vehicle configured to reset a plurality of user-adjustable vehicle parameters to a default setting in response to the configuration bit and an indication of a conclusion of a vehicle usage associated with the vehicle.

11. The method of claim 10, wherein resetting the plurality of user-adjustable vehicle parameters includes remotely resetting the plurality of user-adjustable vehicle parameters.

12. The method of claim 11, further comprising establishing the remotely resetting as remotely resetting with one of a key fob and a wireless device.

13. The method of claim 10, wherein resetting the plurality of user-adjustable vehicle parameters includes entering a vehicle control pattern using a plurality of vehicle control inputs.

14. The method of claim 13, wherein the plurality of vehicle control inputs include at least one of a vehicle door lock switch and an ignition switch.

15. The method of claim 10, further comprising receiving the indication of the conclusion of the vehicle usage; and
    resetting the plurality of user-adjustable vehicle parameters to the default setting in response to the received indication.

16. A vehicle, comprising:
    a processor in communication with a plurality of user-adjustable vehicle settings; and
    a configuration bit stored on the vehicle, the configuration bit indicating that the vehicle is a fleet vehicle;
    wherein the processor is configured to reset a plurality of user-adjustable vehicle parameters to a default setting in response to at least the configuration bit and an indication of a conclusion of a vehicle usage associated with the vehicle.

17. The vehicle of claim 16, wherein the processor is configured to reset the plurality of user-adjustable vehicle parameters in response to a remote signal.

18. The vehicle of claim 17, further comprising a key fob in wireless communication with the vehicle, the key fob configured to transmit the remote signal.

19. The vehicle of claim 16, wherein the processor is configured to reset the plurality of user-adjustable vehicle parameters to a default setting in response to at least a vehicle control pattern entered using a plurality of vehicle control inputs.

20. The vehicle of claim 19, wherein the plurality of vehicle control inputs include at least one of a vehicle door lock switch and an ignition switch.

* * * * *